United States Patent [19]
Apfel

[11] Patent Number: 5,428,682
[45] Date of Patent: Jun. 27, 1995

[54] SUBSCRIBER LINE INTERFACE CIRCUIT WITH REDUCED ON-CHIP POWER DISSIPATION

[75] Inventor: Russel J. Apfel, Austin, Tex.

[73] Assignee: Advanced Micro Devices, Inc., Sunnyvale, Calif.

[21] Appl. No.: 31,785

[22] Filed: Mar. 12, 1993

[51] Int. Cl.6 .......................................... H04M 19/00
[52] U.S. Cl. ..................... 379/413; 379/398; 379/399
[58] Field of Search ................ 379/399, 413, 398

[56] References Cited

U.S. PATENT DOCUMENTS

| | | | |
|---|---|---|---|
| 4,677,667 | 6/1987 | Burns | 379/399 |
| 4,677,669 | 6/1987 | Kawami et al. | 379/399 |
| 4,866,768 | 9/1989 | Sinberg | 379/413 |
| 4,879,746 | 11/1989 | Young et al. | 379/399 |
| 5,046,089 | 9/1991 | Pariani et al. | 379/399 |

OTHER PUBLICATIONS

Electronic Design, Jul. 11, 1994 vol. 42, No. 14, article entitled "High-Voltage Bonded-Wafer ICs Create First SLIC to Switch The 93-V RMS Phone-Line Ring Voltage on-Chip, Eliminating PABX Relays", written by Frank Goodenough, pp. 55-64, Cover Page, Table of Contents.
HC-5506 Specification for Dual Subscriber Line Interface Circuit (DSLIC), Harris Semiconductor, Advance Information, Jun. 1994, 16 pages.

Primary Examiner—James L. Dwyer
Assistant Examiner—Jacques M. Saint-Surin
Attorney, Agent, or Firm—Skjerven, Morrill, MacPherson, Franklin & Friel

[57] ABSTRACT

A subscriber line interface circuit is provided that includes an output stage having a pair of differential transconductance amplifiers to drive the tip and ring lines of a telephone exchange. The output stage includes circuitry that advantageously reduces the power dissipated within the integrated circuit when the subscriber loop impedance is relatively low. As a result, heat generation within the integrated circuit is reduced. Circuit reliability may therefore be enhanced and fabrication and packaging costs may be reduced. In one embodiment, an off-chip resistor is coupled from an output line of the ring line amplifier to the negative voltage rail. When the loop impedance is low, a relatively large voltage drop is established across the resistor which therefore absorbs a greater percentage of the loop current. Since the resistor is provided off-chip and diverts current that would otherwise flow through the ring-line amplifier, the overall heat dissipated within the integrated circuit is reduced.

42 Claims, 4 Drawing Sheets

SUBSCRIBER LINE INTERFACE CIRCUIT WITH REDUCED ON-CHIP POWER DISSIPATION

BACKGROUND OF THE INVENTION

1. Field of the Invention

This invention relates to telephone subscriber line interface circuits (SLIC's) for telecommunication transmission, data communication and telephone switching system applications. This invention also relates to the management of power within subscriber line interface circuits.

2. Description of the Relevant Art

In earlier years of telephony, transformer based circuits were used to interface the telephone subscriber line to a telephone exchange. With the advent of improved cost and performance parameters of integrated circuit technology, solid state subscriber line interface circuits (SLIC's) were developed and are currently in wide use in the telecommunications industry. These SLIC circuits allow for reduced equipment cost, reduced power dissipation, and reduced space consumption in comparison to their hybrid transformer predecessors.

Subscriber line interface circuits, which serve to connect the subscriber to digital switching equipment within the telephone exchange, are designed to perform a variety of functions. These functions include sourcing DC power to the subscriber loop while terminating the with the proper AC impedance, interfacing the two-wire loop with four-wire transmission equipment, rejecting longitudinal signals on the subscriber loop, and detecting the off-hook condition of subscriber equipment. A subscriber line interface circuit typically includes a current detector which detects the subscriber going off-hook during ringing (ring-trip). In particular, when the subscriber is being called, AC ringing signals are applied to the subscriber loop to operate the telephone ringer. When the subscriber goes off-hook, the resulting loop current is detected to interrupt the ringing signals on the loop. The transmission of alternating current voice signals is thereafter accommodated between the subscriber and telephone exchange through the SLIC circuitry.

FIG. 1 is a schematic diagram illustrating basic components within the receive output stage 10 of a typical subscriber line interface circuit 11 that is fabricated on an integrated circuit. The receive output stage 10 comprises a pair of operational amplifiers 12 and 14 configured as differential transconductance amplifiers. Such transconductance amplifiers generate an output current which is linearly dependent upon the differential input voltages applied thereto. The transconductance amplifiers typically provide a current gain of approximately 500. This current gain can be attained, for example, by selecting the resistance of a resistor 16 at 20 ohms and the resistance of a resistor 18 at 10 k ohms.

The receive output stage 10 is an integral portion of the SLIC circuitry known as the two-wire to four-wire converter. Other portions (not shown) of the two-wire to four-wire converter include a transmit amplifier and balance circuitry. The two-wire to four-wire converter inherently rejects longitudinal (common-mode) noise induced onto the subscriber loop from close proximity telephone and power cables. Additional suppression circuitry ensures that high-level longitudinal signals do not exceed the operating voltage range of the SLIC amplifiers.

The operational amplifier 12 drives a telephone subscriber loop tip line 15 through resistor 16 and the operational amplifier 14 drives a telephone subscriber loop ring line 17 through resistor 32. A telephone 20 is shown connected to the tip and ring lines 15 and 17. The circuit is powered from ground to a battery voltage of $-50$ volts and operates around a predetermined quiescent point within the range defined by these voltage rails.

An input and monitor circuit 25 is shown coupled to the receive output stage 10. The input and monitor circuit 25 receives voice signals through a system interface and correspondingly drives the receive output stage 10. The input and monitor circuit 25 provides a variety of other functions, including amplification of transmit signals provided from telephone 20 through lines 26 and 27. Control circuitry is further incorporated within the input and monitor circuit 25 to support other so-called BORSCHT functions (battery feed, overvoltage protection, ringing, supervision, coding, hybrid, and test) of the SLIC. Implementations of such SLIC circuitry are described in detail in the literature of the known prior art, such as in the IEEE Journal of Solid State Circuits, Vol. SC-16, No. 4, August 1981, pp. 261–276.

Industry standards specify that the DC current flowing through the subscriber loop when the telephone 20 is off-hook be nominally 30–40 mA. This DC current provides power to the telephone circuitry such as a digital keypad. The impedance of the subscriber loop depends upon the particular telephone connected to the loop as well as the transmission length of the loop. Typical values of loop resistance range between 0 to 2000 ohms. The SLIC must therefore be designed to provide the nominal DC current ($I_{DC}$) for this range of loop impedances while still allowing transmission of the AC voice signals. One way of achieving this is to maintain node X at a DC voltage of approximately $-5$ volts while regulating the current flowing through resistor 32 such that the loop current equals the nominal current of, say, 40 mA. Such a system is known as an unbalanced system. It is noted that the input and monitor circuit 25 controls the operational amplifiers 12 and 14 to maintain the desired DC operating voltage and current. Depending upon the loop resistance, the DC voltage at node Y will be established at some operating point between $-5$ volts and the negative voltage rail of $-50$ volts. As represented by the waveforms at the tip and ring leads, a differential AC signal may be imposed upon the DC operating current to transmit voice signals.

The power dissipated by the transistor drivers of operational amplifier 14 in this situation depends upon the loop impedance. The power dissipated by the transistor drivers of operational amplifier 12 is, on the other hand, relatively constant and low since a voltage at node X is fixed at only approximately $-5$ volts. Take for example the case where the loop impedance is 1000 ohms. If resistors 16 and 32 are each selected at 20 ohms and node X is regulated at a DC voltage of $-5$ volts, then a DC voltage of $-45$ volts is established at node Y when the nominal current of 40 mA flows through the loop. On the other hand, if the loop impedance is only 300 ohms when the nominal 40 mA current flows through loop, a voltage of $-17$ volts is established at node Y. The voltage drop across each of resistors 16 and 32 is approximately 0.8 volts in either case. Thus, the power dissipated by the transistor drivers of operational amplifier 14 can be approximated by the voltage drop between the output line of the amplifier and the −50 volt supply. For the case where the loop resistance is 1000 ohms, the approximate power dissipation is (50−45.8 V)×(40 mA)=168 mW. On the other hand, the power dissipated by the transistor drivers of operational amplifier 14 for the case where the loop resistance is 300 ohms is approximately (50−7.8 V)×(40 mA)=1.29 W.

The power dissipated by the transistor drivers of operational amplifier 12 can be approximated by the voltage drop between the output line of the amplifier and ground. Since node X is maintained at a constant voltage, the power dissipated is (4.2−0 V)×(40 mA)=168 mW regardless of the loop impedance.

From the foregoing, it is evident that the power dissipated by the driver transistors of operational amplifier 14 is dependent upon the loop impedance. The amount of power dissipated increases dramatically as the loop impedance decreases. Since the SLIC circuit must accommodate the broad range of possible loop impedances, the pull-down driver transistor within the output stage of operational amplifier 14 must sink a relatively large current when the loop impedance is low. This therefore requires that the driver transistor be relatively large and further results in increased heat generation within the integrated circuit when the loop impedance is low. This poses problems with the reliability of the integrated circuit and generally results in increased fabrication and packaging costs.

SUMMARY OF THE INVENTION

A subscriber line interface circuit is therefore provided that includes an output stage having a pair of differential transconductance amplifiers to drive the tip and ring lines of a telephone exchange. The output stage includes circuitry that advantageously reduces the power dissipated within the integrated circuit when the subscriber loop impedance is relatively low. As a result, heat generation within the integrated circuit is reduced. Circuit reliability may therefore be enhanced and fabrication and packaging costs may be reduced. In one embodiment, an off-chip resistor is coupled from an output line of the ring line amplifier to the negative voltage rail. When the loop impedance is low, a relatively large voltage drop is established across the resistor which therefore absorbs a greater percentage of the loop current. Since the resistor is provided off-chip and diverts current that would otherwise flow through the ring-line amplifier, the overall heat dissipated within the integrated circuit is reduced.

These and other advantages are achieved with the present invention, in accordance with which a subscriber line interface circuit comprises an input circuit for receiving voice signals from a telephone exchange, a first output driver coupled to the input circuit for driving a tip line of a telephone subscriber loop and a second output driver coupled to the input circuit for driving a ring line of the telephone subscriber loop. The first and second output drivers receive power from a power supply having a first reference voltage terminal and a second reference voltage terminal. A resistor is coupled between the second reference voltage terminal and an output line of either the first or the second output driver.

In accordance with another aspect of the invention, a subscriber line interface circuit comprises an input circuit for receiving voice signals from a telephone exchange, a first operational amplifier coupled to the input circuit and including an output line for driving a tip line of a telephone subscriber loop and a second operational amplifier coupled to the input circuit and including an output line for driving a ring line of the telephone subscriber loop. The first and second operational amplifiers receive power from a power supply having a first reference voltage terminal and a second reference voltage terminal and are configured to provide a regulated DC current through the ring and tip lines when a telephone subscriber is off-hook. A first resistor is coupled between the output line of the second operational amplifier and the second reference voltage terminal, a second resistor is coupled in series between the output line of the second operational amplifier and the ring line and a third resistor is coupled in series between the output line of the first operational amplifier and the tip line.

The invention will be more readily understood with reference to the drawings and the detailed description. As will be appreciated by one skilled in the art, the invention is applicable to subscriber line interface circuits in general and is not limited to the specific embodiments disclosed.

DETAILED DESCRIPTION

The following includes a detailed description of the best presently contemplated modes for carrying out the invention. The description is intended to be merely illustrative of the invention and should not be taken in a limiting sense.

Figure 1:
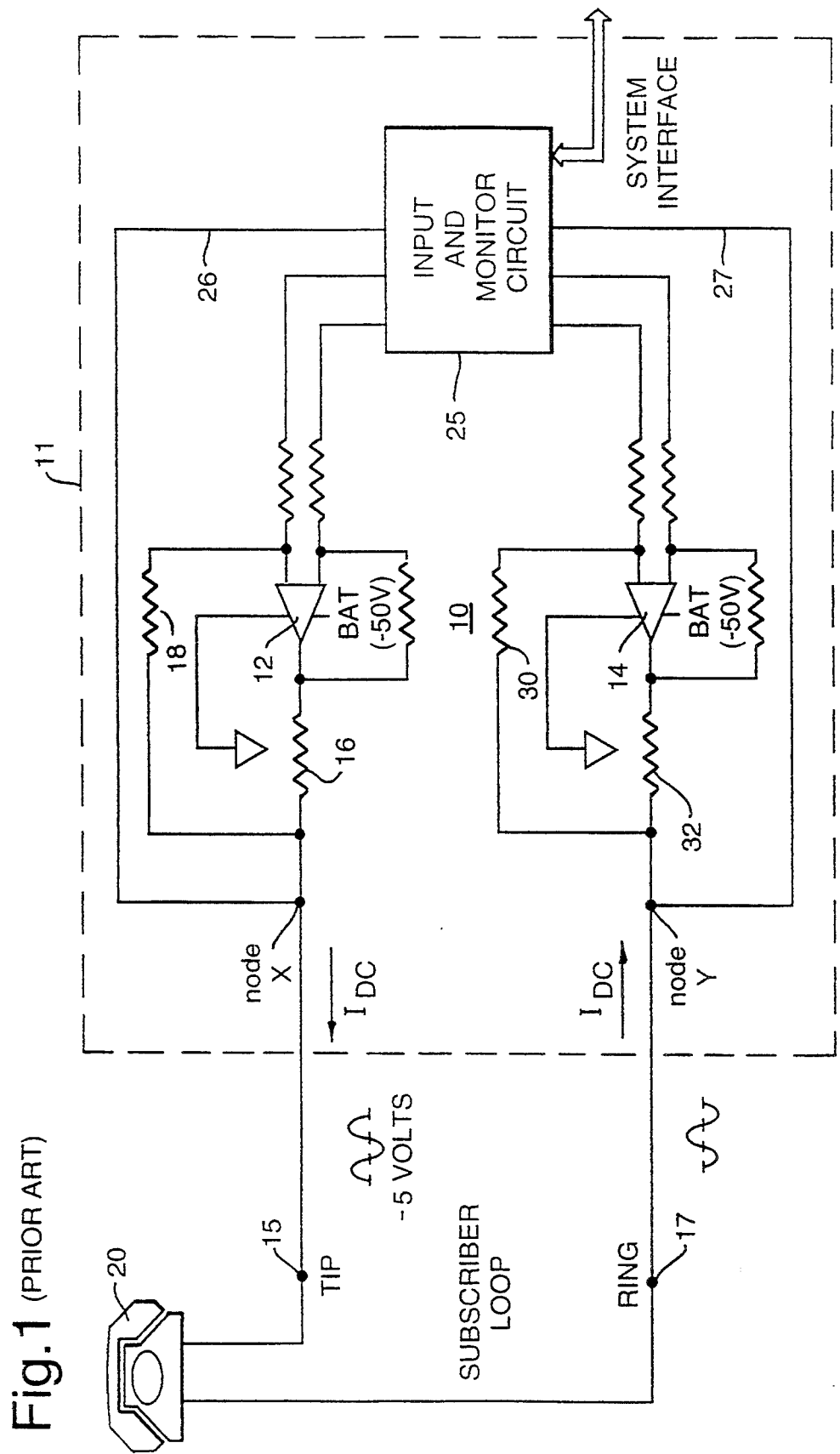
FIG. 1 is a schematic diagram illustrating basic components within a receive output stage of a typical subscriber line interface circuit fabricated on an integrated circuit.
Figure 2:
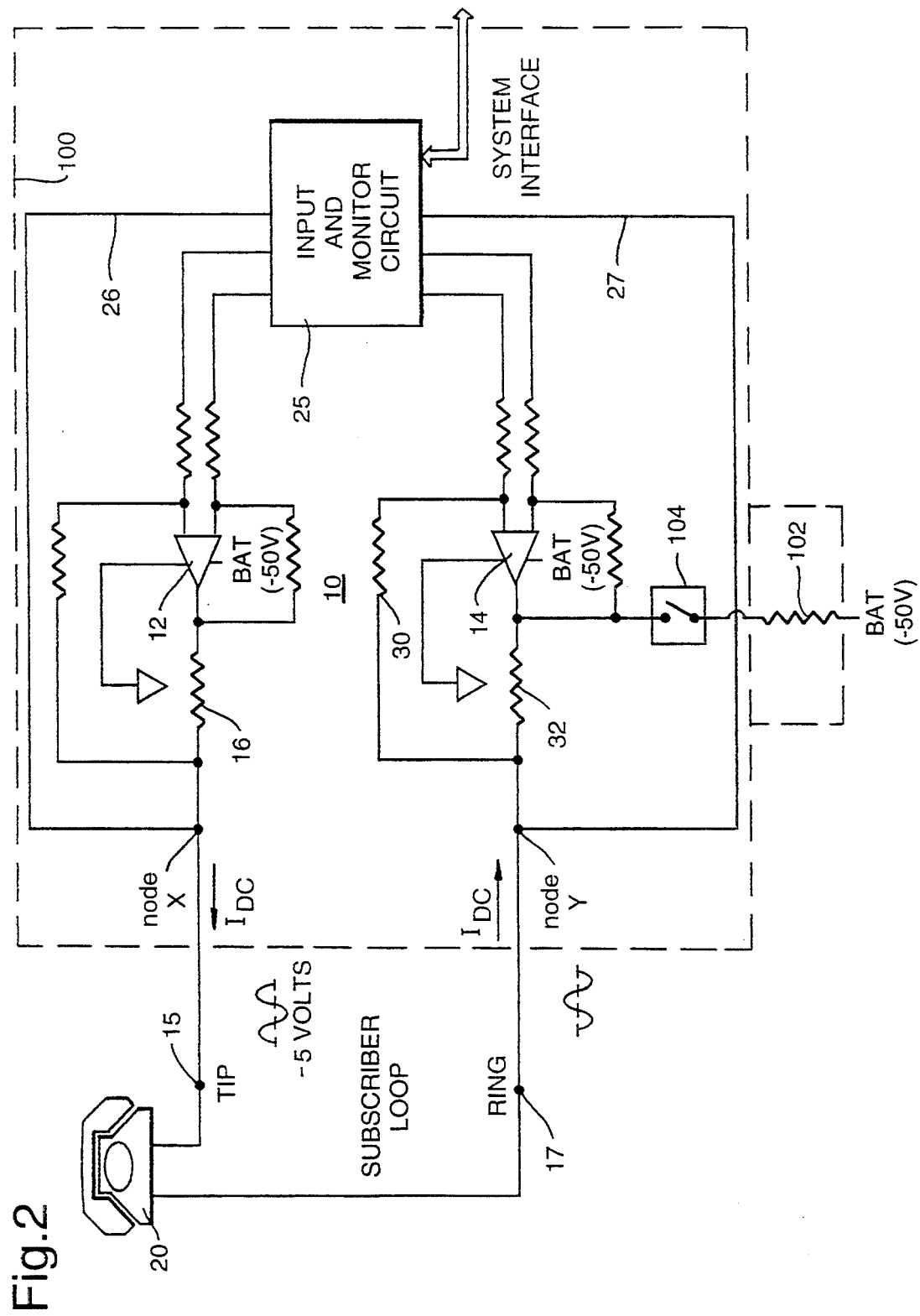
FIG. 2 is a schematic diagram of an unbalanced subscriber line interface circuit that incorporates an off-chip resistor coupled to the ring-line amplifier for power management.

Referring to FIG. 2, a schematic diagram is shown of an unbalanced subscriber line interface circuit 100 including a current sink resistor 102 and an electronic switch 104 coupled between the output line of the ring-line operational amplifier 14 and the −50 volt supply terminal. Resistor 102 is provided externally from an integrated circuit chip that forms the remaining SLIC circuitry. Circuit components and elements that correspond to those of FIG. 1 are numbered identically. In this embodiment, resistor 102 is characterized with a resistance of 1000 ohms.

As discussed previously, a receive output stage 10 comprises a pair of operational amplifiers 12 and 14 which are configured as differential transconductance amplifiers. In this embodiment, the transconductance amplifiers provide a current gain of 500. In addition, the input and monitor circuit 25 maintains a DC operating voltage at node X of −5 volts and maintains the loop current $I_{DC}$ at a nominal value of 40 mA. It is noted that the input and monitor circuit 25 also provides AC voice signals to the transconductance amplifiers and may further accommodate a variety of other functions, such as BORSCHT functions (battery feed, over voltage protection, ringing, supervision, coding, hybrid, and test) of the SLIC. As stated previously, a variety of implementations of such input and monitor circuitry is described in detail in the literature of the known prior art.

During normal operation of the subscriber line interface circuit 100, switch 104 is closed and thus a current path is provided through resistor 102 between the output line of operational amplifier 14 and the −50 volt supply. If the loop resistance is 1000 ohms as considered above, the voltage at node Y is −45 volts. Given this and assuming the resistance of each of the resistors 16 and 32 is 20 ohms, the voltage at the output of operational amplifier 14 is −45.8 volts. Consequently, a current of (50−45.8 V)/(1000 ohms)=4.2 mA flows through resistor 102. Therefore, the remainder of the loop current (40−4.2 mA)=35.8 mA flows through the transistor drivers of operational amplifier 14. Therefore in this case, the power dissipated by the transistor drivers of operational amplifier 14 equals (50−45.8 V)×(35.8 mA)=150 mW.

If the loop resistance is 300 ohms, the voltage at node Y is −17 volts. Given this, the voltage at the output line of operational amplifier 14 is −17.8 volts. Consequently, a current of (50−17.8 V)/(1000 ohms)=32 mA flows through resistor 102. Thus the power dissipated by the transistor drivers of operational amplifier 14 equals (50−17.8 V)×(40−32 mA)=257 mW. Since resistor 102 is provided off-chip, the overall thermal dissipation within the integrated circuit is reduced in that the power dissipated by operational amplifier 14 is substantially less than the power dissipated by the corresponding amplifier in the exemplary circuit of FIG. 1, as analyzed previously. Reliability may therefore be enhanced and fabrication and packaging costs may be reduced.

It is noted that since resistor 102 is coupled between resistor 32 and the output line of operational amplifier 14, the entire 40 mA of loop current flows through resistor 32. That is, the connection of resistor 102 does not affect the amount of current that flows through resistor 32. This characteristic is important since resistor 32 is used as a current sensing resistor to provide appropriate feedback signals to maintain the loop current at 40 mA.

It is also noted that switch 104 may be opened to eliminate the current path through resistor 102. This may be desirable when, for example, the subscriber line interface circuit is operated in alternative operating modes, such as test modes or to support coin-operated telephone systems. For instance, it may be desirable in some situations to open switch 104 and reverse the direction of the loop current.

It is further noted that switch 104 may be implemented using a switching transistor. In addition, if the accommodation of alternative operating modes is unnecessary, switch 104 could be eliminated such that resistor 102 would be directly-connected to the output line of operational amplifier 14.

Further, variations of the subscriber line interface circuit as shown in FIG. 2 may also be possible without departing from the spirit and scope of the invention. For example, other input circuitry connected to the transconductance amplifiers may be utilized, and lightening protection circuitry may be coupled in parallel with the subscriber loop. In addition, depending upon the quiescent voltages and current maintained on the subscriber loop, it may be desirable to couple an additional off-chip resistor between the output line of operational amplifier 12 and ground to decrease the power dissipated within operational amplifier 12. Such a decrease in power dissipation would occur in accordance with the same principles described above with respect to resistor 102 and operational amplifier 14.

Figure 3:
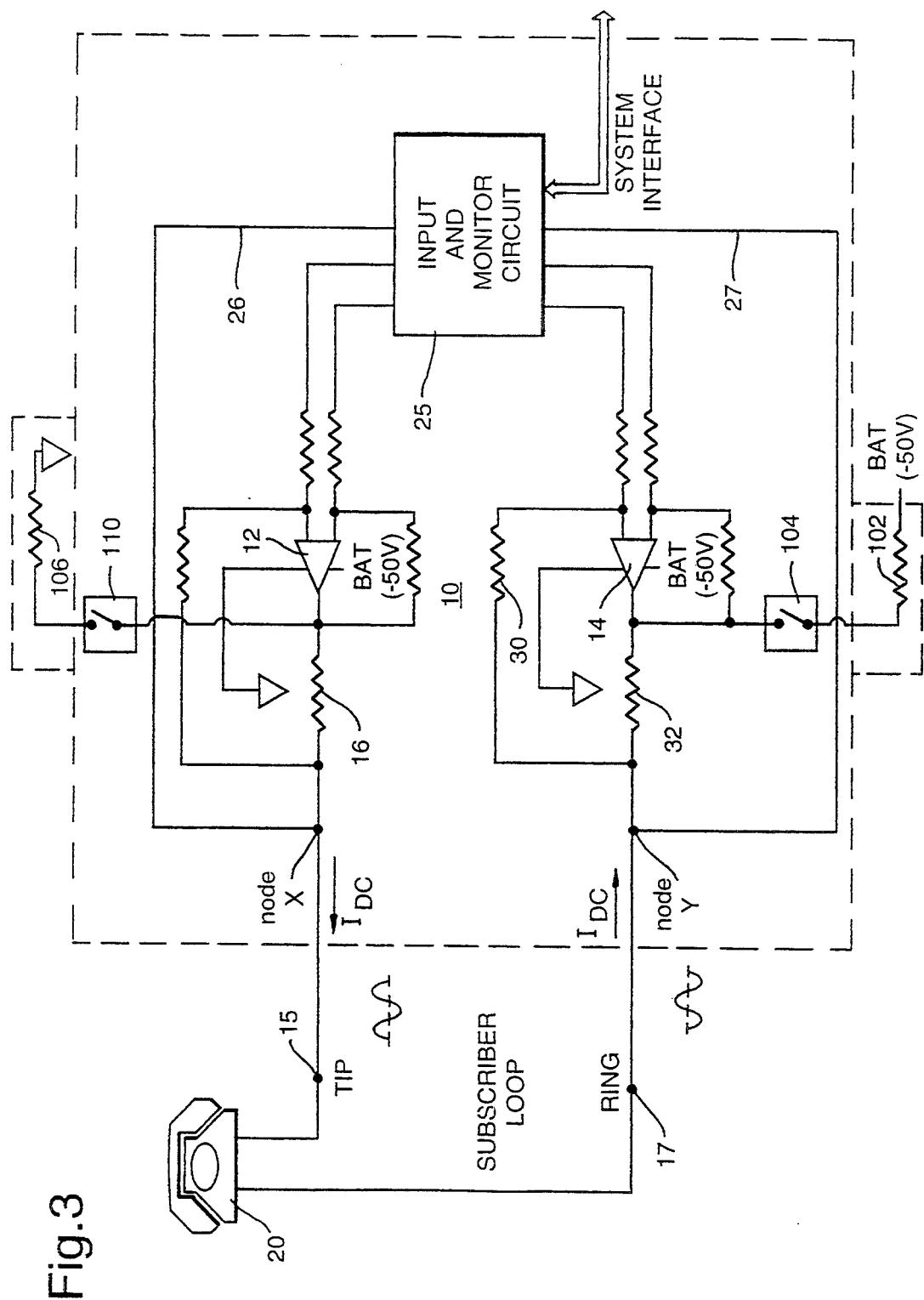
FIG. 3 is a schematic diagram of a balanced subscriber line interface circuit including a pair of off-chip resistors coupled to the ring-line and tip-line amplifiers for power management.

FIG. 3 is a schematic diagram of a second embodiment of a subscriber line interface circuit. The circuit of FIG. 3 is similar to that of FIG. 2 and corresponding components thereof are numbered identically. The subscriber line interface circuit of FIG. 3 is a balanced system wherein the voltages at nodes X and Y vary symmetrically depending upon the subscriber loop impedance. In this embodiment, the voltage at node X may drop far below the −5 volt regulated value as described in conjunction with the unbalanced system of FIG. 2. Since this significantly increases the power dissipated by the driver transistors within operational amplifier 12, an off-chip resistor 106 is coupled through an electronic switch 110 between the output line of operational amplifier 12 and ground.

During normal operation, both switches 104 and 110 are closed. Using conventional circuit analysis techniques, it is evident that the more negative the voltage at node X goes, the more current that will flow through resistor 106. This consequently has the effect of reducing the power dissipated within the driver transistors of operational amplifier 12 in comparison to a situation where resistor 106 is not provided. Since resistor 106 is not fabricated on the integrated circuit, overall heat dissipation by the integrated circuit is reduced. A similar effect occurs with respect to the power dissipated by operational amplifier 14, as described previously. It is noted that the same configuration could also be used in conjunction with an unbalanced system.

Figure 4:
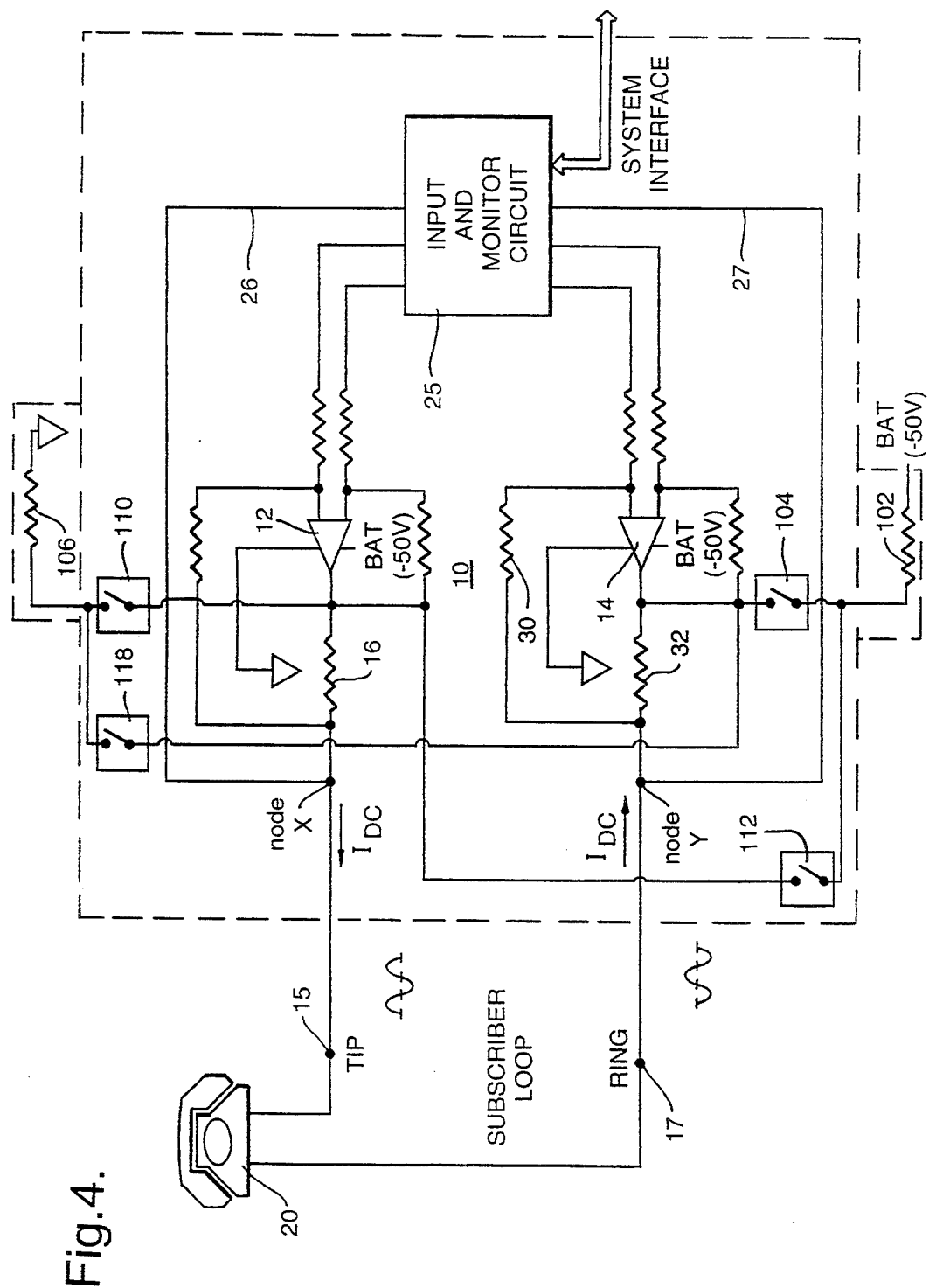
FIG. 4 is a schematic diagram of an additional embodiment of a subscriber line interface circuit.

Referring next to FIG. 4, a third electronic switch 112 may be provided between the output line of operational amplifier 12 and resistor 102. Similarly, a fourth electronic switch 118 may be provided between the output line of operational amplifier 14 and resistor 106. During normal operation as described above, switches 112 and 118 are open and thus do not affect the current paths of the circuit. Switches 112 and 118 may be closed and switches 104 and 110 may be opened to accommodate low on-chip power dissipation during alternative operating modes of the subscriber line interface circuit when the loop current is reversed. It is noted that switches 104, 110, 112 and 118 may be implemented using transistors.

Numerous modifications and variations will become apparent to those skilled in the art once the above disclosure is fully appreciated. For example, although the output stage 10 of the embodiments described above includes a pair of transconductance amplifiers, a variety of other types of output drivers that drive the subscriber loop could be provided.

It is to be understood that the above detailed description of the preferred embodiments is intended to be merely illustrative of the spirit and scope of the invention and should not be taken in a limiting sense. The scope of the claimed invention is better defined with reference to the following claims.

What is claimed is:

1. A subscriber line interface circuit comprising:
an input circuit for receiving signals from a telephone exchange;

a first output driver circuit coupled to said input circuit for driving a tip line of a subscriber loop;

a second output driver circuit coupled to said input circuit for driving a ring line of said subscriber loop; and a first resistor coupled between said second output driver circuit and a first voltage terminal so that direct current flow in said subscriber loop is independent of direct current flow through said first resistor and power dissipation is moderated in said second output driver circuit when an off-hook condition exists between said tip line and said ring line.

2. The subscriber line interface circuit as recited in claim 1 wherein said first output driver circuit comprises a first operational amplifier and wherein said second output driver circuit comprises a second operational amplifier.

3. The subscriber line interface circuit as recited in claim 2 wherein said first and second output drivers are configured as differential transconductance amplifiers.

4. The subscriber line interface circuit as recited in claim 1 wherein said input circuit and said first and second output driver circuits are fabricated on an integrated circuit and wherein said first resistor is provided off the integrated circuit.

5. The subscriber line interface circuit as recited in claim 1 further comprising a second resistor coupled between said first output driver circuit and a second voltage terminal so that direct current flow in said subscriber loop is independent of direct current flow through said second resistor and power dissipation is moderated in said first output driver circuit.

6. The subscriber line interface circuit as recited in claim 1 further comprising a switch coupled in series between said first resistor and said second output driver circuit.

7. The subscriber line interface circuit as recited in claim 6 wherein said switch is a transistor switch.

8. A subscriber line interface circuit comprising:
an input circuit for receiving signals from a telephone exchange;
a first output driver circuit coupled to said input circuit for driving a tip line of a subscriber loop;
a second output driver circuit coupled to said input circuit for driving a ring line of said subscriber loop; and
a first resistor coupled between said first output driver circuit and a first voltage terminal so that direct current flow in said subscriber loop is independent of direct current flow through said first resistor and power dissipation is moderated in said first output driver circuit when an off-hook condition exists between said tip line and said ring line.

9. The subscriber line interface circuit as recited in claim 8 wherein said first output driver circuit comprises a first operational amplifier and wherein said second output driver circuit comprises a second operational amplifier.

10. The subscriber line interface circuit as recited in claim 9 wherein said first and second output drivers are configured as differential transconductance amplifiers.

11. The subscriber line interface circuit as recited in claim 8 wherein said input circuit and said first and second output driver circuits are fabricated on an integrated circuit and wherein said first resistor is provided off the integrated circuit.

12. The subscriber line interface circuit as recited in claim 8 further comprising a second resistor coupled between said second output driver circuit and a second voltage terminal so that direct current flow in said subscriber loop is independent of direct current flow through said first resistor and power dissipation is moderated in said first output driver circuit.

13. The subscriber line interface circuit as recited in claim 8 further comprising a switch coupled in series between said first resistor and said first output driver circuit.

14. The subscriber line interface circuit as recited in claim 13 wherein said switch is a transistor switch.

15. A subscriber line interface circuit comprising:
an input circuit having an input for receiving signals from a telephone exchange;
a first resistor having a first terminal coupled to a tip line terminal, and further having a second terminal;
a first operational amplifier having an input coupled to an output of said input circuit and an output coupled to the second terminal of said first resistor;
a first feedback circuit coupled to said first operational amplifier, said first feedback circuit configuring said first operational amplifier to provide a regulated DC current through said first resistor when the subscriber line is in an off-hook condition;
a second resistor having a first terminal coupled to a ring line terminal, and further having a second terminal;
a second operational amplifier having an input coupled to an output of said input circuit and an output coupled to the second terminal of said second resistor;
a second feedback circle coupled to said second operational amplifier, said second feedback circuit configuring said second operational amplifier to provide the regulated DC current through said second resistor when the subscriber line is in an off-hook condition; and
a third resistor having a first terminal coupled between the output of said second operational amplifier and the second terminal of said second resistor, and a second terminal coupled to a first voltage terminal.

16. The subscriber line interface circuit as recited in claim 15 wherein said input circuit and said first and second operational amplifiers are fabricated on an integrated circuit and wherein said first resistor is provided off the integrated circuit.

17. The subscriber line interface circuit as recited in claim 15 further comprising a fourth resistor having a first terminal coupled between the output of said first operational amplifier and the second terminal of said first resistor, and a second terminal coupled to a second voltage terminal.

18. The subscriber line interface circuit as recited in claim 15 further comprising a switch coupled in series between said third resistor and the output of said second operational amplifier.

19. The subscriber line interface circuit as recited in claim 18 wherein said switch is a transistor switch.

20. The subscriber line interface circuit as recited in claim 17 further comprising a switch coupled in series between said fourth resistor and the output of said first operational amplifier.

21. The subscriber line interface circuit as recited in claim 5 further comprising:

a third voltage terminal coupled to said first output driver circuit; and a fourth voltage terminal coupled to said second output driver, wherein said second voltage terminal and said fourth voltage terminal are at ground potential, and said first voltage terminal and said third voltage terminal are at a voltage potential of minus 50 volts.

22. The subscriber line interface circuit as recited in claim 1 wherein said first resistor is further coupled between said first output driver circuit and said first voltage terminal.

23. The subscriber line interface circuit as recited in claim 22 further comprising a switch coupled in series between said first resistor and said first output driver circuit.

24. The subscriber line interface circuit as recited in claim 5 further comprising a switch coupled in series between said second resistor and said first output driver circuit.

25. The subscriber line interface circuit as recited in claim 5 wherein said second resistor is further coupled between said second output driver and said second voltage terminal.

26. The subscriber line interface circuit as recited in claim 25 further comprising a switch coupled in series between said second resistor and said second output driver.

27. The subscriber line interface circuit as recited in claim 8 further comprising:

a third voltage terminal coupled to said first output driver circuit;

a fourth voltage terminal coupled to said second output driver, wherein said first voltage terminal and said second voltage terminal are at ground potential, and said second voltage terminal and said fourth voltage terminal are at a voltage potential of minus 50 volts.

28. A subscriber line interface circuit comprising:

an input circuit receiving signals from a telephone exchange;

a first output driver circuit coupled to said input circuit and having an output driving a tip line signal onto a subscriber loop;

a second output driver circuit coupled to said input circuit and having an output driving a ring line signal with a substantially constant DC current component onto the subscriber loop, said second output driver circuit including a first current sensing element having a first terminal coupled to the subscriber loop and a second terminal coupled to the output of said second output driver to convey the ring line signal thereto; and a first resistive element external to said second output driver circuit and having a first terminal coupled between the second terminal of said current sensing element and the output of said second output driver, and a second terminal coupled to a first voltage terminal so that power dissipation in said second output driver circuit is moderated.

29. The subscriber line interface circuit as recited in claim 28 wherein said first output driver circuit comprises a first operational amplifier and wherein said second output driver circuit comprises a second operational amplifier.

30. The subscriber line interface circuit as recited in claim 29 wherein said first and second output drivers are configured as differential transconductance amplifiers.

31. The subscriber line interface circuit as recited in claim 28 wherein:

said tip line signal includes a substantially constant DC current component;

said first output driver circuit includes a second current sensing element having a first terminal coupled to the subscriber loop and a second terminal coupled to the output of said first output driver to convey the tip line signal thereto; and said subscriber line interface circuit further comprises a second resistive element external to said first output driver circuit and having a first terminal coupled between the second terminal of said second current sensing element and the output of said first output driver, and a second terminal coupled to a second voltage terminal so that power dissipation in said first output driver circuit is moderated.

32. The subscriber line interface circuit as recited in claim 31 further comprising a switch coupled in series between said first terminal of said second resistor and said second terminal of said second current sensing element.

33. The subscriber line interface circuit as recited in claim 31 wherein said first terminal of said second resistor is further coupled to said second terminal of said first current sensing element.

34. The subscriber line interface circuit as recited in claim 33 further comprising a switch coupled in series between said first terminal of said second resistor and said second terminal of said first current sensing element.

35. The subscriber line interface circuit as recited in claim 28 further comprising a switch coupled in series between said first terminal of said first resistor and said second terminal of said first current sensing element.

36. The subscriber line interface circuit as recited in claim 28 wherein said first terminal of said first resistor is further coupled to said second terminal of said second current sensing element.

37. The subscriber line interface circuit as recited in claim 36 further comprising a switch coupled in series between said first terminal of said first resistor and said second terminal of said second current sensing element.

38. The subscriber line interface circuit as recited in claim 28 further comprising:

a third voltage terminal coupled to said first output driver circuit;

a fourth voltage terminal coupled to said second output driver, wherein said second voltage terminal and said fourth voltage terminal are at ground potential, and said first voltage terminal and said third voltage terminal are at a voltage potential of minus 50 volts.

39. The subscriber line interface circuit as recited in claim 23 further comprising:

a second switch coupled in series between said first resistor and said second output driver circuit;

a second resistor coupled between said first output driver circuit and a second voltage terminal so that direct current flow in said subscriber loop is independent of direct current flow through said second resistor and power dissipation is moderated in said first output driver circuit, and further coupled between said second output driver and said second voltage terminal;

a third switch coupled in series between said second resistor and said first output driver circuit; and a fourth switch coupled in series between said second resistor and said second output driver.

40. A subscriber line interface integrated circuit having a tip node and a ring node, the subscriber line interface circuit comprising:

a first transconductance amplifier having an output coupled to the tip node, an input, and a feedback path coupled across the output and input;

a second transconductance amplifier having an output coupled to the ring node, an input, and a feedback path coupled across the output and input;

an off-chip resistor node in the feedback path of the second transconductance amplifier; and a system interface having a plurality of I/O nodes, a first node coupled to the input of the first transconductance amplifier, and a second node coupled to the input of the second transconductance amplifier.

41. The subscriber line interface circuit of claim 40 further comprising:

a first reference voltage node; and a power sharing resistor coupled between the first reference voltage node and the off chip resistor node.

42. A subscriber line interface circuit coupled to a first voltage reference terminal and a second voltage reference terminal and having a tip line terminal and a ring line terminal for coupling the subscriber line interface circuit to a subscriber loop, the subscriber loop having a subscriber loop impedance defined in part by a tip line, a ring line, and a telephone connected between the tip line and ring line, the subscriber loop interface circuit comprising:

a first amplifier circuit having an output coupled to the tip line terminal and an input;

a second amplifier circuit having an output coupled to the ring line terminal and an input;

an input and monitor circuit having an input coupled to the system interface for receiving signals, a first node coupled to the tip line terminal and a second node coupled to the ring line terminal to detect a telephone off-hook condition, the input and monitor circuit further having a third node coupled to the first amplifier circuit input and a fourth node coupled to the second amplifier circuit input, wherein when the input and monitor circuit is coupled to the subscriber loop the input and monitor circuit responds to the telephone off-hook condition and the subscriber loop impedance and controls the first and second amplifier circuits to establish an operating voltage across the subscriber loop and a loop current in the subscriber loop;

a first resistor coupled between the first voltage reference terminal and the first amplifier circuit output; and a second resistor coupled between the second voltage reference terminal and the second amplifier circuit output, wherein the first amplifier circuit delivers a first portion of the loop current to the subscriber loop and the first resistor delivers a second portion of the loop current, the second amplifier circuit sinks a third portion of the loop current and the second resistor sinks a fourth portion of the loop current.

* * * * *